United States Patent
Sugio et al.

(10) Patent No.: US 10,603,619 B2
(45) Date of Patent: Mar. 31, 2020

(54) OIL SEPARATOR

(71) Applicant: NABTESCO AUTOMOTIVE CORPORATION, Tokyo (JP)

(72) Inventors: Takuya Sugio, Tokyo (JP); Hiroaki Kawanami, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 509 days.

(21) Appl. No.: 15/121,224

(22) PCT Filed: Mar. 2, 2015

(86) PCT No.: PCT/JP2015/056055
§ 371 (c)(1),
(2) Date: Aug. 24, 2016

(87) PCT Pub. No.: WO2015/129914
PCT Pub. Date: Sep. 3, 2015

(65) Prior Publication Data
US 2017/0021300 A1    Jan. 26, 2017

(30) Foreign Application Priority Data
Feb. 28, 2014    (JP) ................. 2014-038507

(51) Int. Cl.
*B01D 50/00*    (2006.01)
*B01D 45/08*    (2006.01)
(Continued)

(52) U.S. Cl.
CPC ....... *B01D 50/002* (2013.01); *B01D 39/2017* (2013.01); *B01D 45/08* (2013.01);
(Continued)

(58) Field of Classification Search
CPC .............. B01D 50/002; B01D 39/2017; B01D 46/0024; B01D 53/261; B01D 46/003;
(Continued)

(56) References Cited

U.S. PATENT DOCUMENTS 3,554,700 A * 1/1971 Maxon ............. G01N 35/00009
141/130
3,747,773 A * 7/1973 Jackson ................. B01D 29/01
156/291
(Continued)

FOREIGN PATENT DOCUMENTS

| JP | S57-35819 U | 2/1982 |
| JP | S63-232815 A | 9/1988 |

(Continued)

OTHER PUBLICATIONS

International Search Report as issued in International Patent Application No. PCT/JP2015/056055, dated Apr. 7, 2015.
(Continued)

*Primary Examiner* — Dung H Bui
(74) *Attorney, Agent, or Firm* — Pillsbury Winthrop Shaw Pittman, LLP

(57) ABSTRACT

The objective is to improve the oil trapping rate of an oil separator. The oil separator separates gas and liquid in air containing oil, recovers liquid that contains oil. The oil separator is provided with an introduction port for introducing air, an oil trap for trapping oil contained in air, a reservoir for storing the liquid flowing out of the oil trap, and a discharge port for discharging air from which oil has been removed. The oil trap includes a glass fiber filter and an impingement member, which traps oil particles by causing the oil particles to strike the impingement member.

11 Claims, 8 Drawing Sheets

(51) Int. Cl.
  *B01D 46/00* (2006.01)
  *F01M 11/08* (2006.01)
  *B01D 39/20* (2006.01)
  *B01D 53/26* (2006.01)
  *B01D 46/10* (2006.01)
  *F01M 13/04* (2006.01)
  *F01M 5/00* (2006.01)
  *B60T 17/00* (2006.01)

(52) U.S. Cl.
  CPC ....... *B01D 46/003* (2013.01); *B01D 46/0024* (2013.01); *B01D 53/261* (2013.01); *F01M 11/08* (2013.01); *B01D 46/10* (2013.01); *B01D 2267/40* (2013.01); *B01D 2275/105* (2013.01); *B60G 2600/66* (2013.01); *B60T 17/004* (2013.01); *F01M 5/001* (2013.01); *F01M 2013/0433* (2013.01); *F01M 2013/0438* (2013.01); *F01M 2013/0488* (2013.01)

(58) Field of Classification Search
  CPC ............... B01D 45/08; B01D 2267/40; B01D 2275/105; B01D 46/10; F01M 11/08; F01M 2013/0433; F01M 5/001; F01M 2013/0438; F01M 2013/0488; B60T 17/004; B60G 2600/66
  See application file for complete search history.

(56) References Cited

U.S. PATENT DOCUMENTS

| | | | | |
|---|---|---|---|---|
| 4,102,785 A * | 7/1978 | Head | ................... | B01D 17/045 210/484 |
| 4,203,739 A * | 5/1980 | Erdmannsdorfer | ......................... | B01D 46/0024 210/315 |
| 4,629,479 A * | 12/1986 | Cantoni | ............. | B01D 46/0023 55/357 |
| 5,085,781 A * | 2/1992 | Tsuru | ....................... | C12N 1/02 210/290 |
| 5,967,127 A | 10/1999 | Okawada et al. | | |
| 9,895,637 B2 * | 2/2018 | Neubauer | .......... | B01D 39/1623 |
| 2003/0192433 A1 * | 10/2003 | Steiner | ................ | B01D 50/002 95/287 |
| 2004/0031252 A1 * | 2/2004 | Heikamp | ........... | B01D 39/2017 55/486 |
| 2007/0028571 A1 * | 2/2007 | Barratt | ............... | B01D 46/0024 55/423 |
| 2015/0343356 A1 | 12/2015 | Sugio et al. | | |
| 2017/0072350 A1 * | 3/2017 | Duchowski | ........ | B01D 39/2017 |

FOREIGN PATENT DOCUMENTS

| | | |
|---|---|---|
| JP | H11-36841 A | 2/1999 |
| JP | 2001-140759 A | 5/2001 |
| JP | 2011-047306 A | 3/2011 |
| JP | 2013-094699 A | 5/2013 |
| JP | 2013-234632 A | 11/2013 |
| JP | 2014-024030 A | 2/2014 |
| WO | 2014/006928 A1 | 1/2014 |

OTHER PUBLICATIONS

International Preliminary Report on Patentability and the Written Opinion of the International Searching Authority as issued in International Patent Application No. PCT/JP2015/056055, dated Sep. 6, 2016.

Notification of Reasons for Refusal dated Jan. 8, 2019 issued in corresponding JP Application No. 2016-505361 with English language translation.

* cited by examiner

OIL SEPARATOR

CROSS-REFERENCE TO RELATED APPLICATIONS

This application is the U.S. National Stage of PCT/JP2015/056055, filed Mar. 2, 2015, which in turn claims priority to Japanese Patent Application No. JP 2014-038507, filed Feb. 28, 2014. The contents of these applications are incorporated herein by reference in their entireties.

TECHNICAL FIELD

The present invention relates to an oil separator that separates oil contained in air.

BACKGROUND ART

For example, vehicles such as trucks, buses, and construction machines use compressed air delivered from the compressor, which is directly connected to the internal combustion engine, in order to control systems such as brakes and suspensions. In any systems including brakes and suspensions, compressed air delivered from the compressor includes water contained in the atmosphere. When the compressed air containing water enters the systems, it may become a cause of an operation defect of the systems. For this reason, an air dryer is provided downstream of the above-mentioned compressor to remove water from the compressed air.

The air dryer executes a loading mode operation for removing water by allowing compressed air to pass through a desiccant and an unloading mode operation for regenerating the desiccant by discharging water trapped by the desiccant to the outside. The air discharged from the air dryer during the unloading mode operation contains oil together with water. Thus, considering the burden on the environment, it has been proposed to provide an oil separator for separating and recovering oil from the air discharged from the air dryer.

The oil separator separates gas and liquid by allowing air containing water and oil to strike an impingement member. Such a gas/liquid separation causes air, or gas from which water and oil have been removed, to be expelled to the outside and water and oil that have been separated from the air to be recovered in the oil separator as collected liquid (for example, see Patent Document 1).

PRIOR ART DOCUMENT

Patent Document

Patent Document 1: Japanese Laid-Open Patent Publication No. 2013-234632

SUMMARY OF THE INVENTION

Problems that the Invention is to Solve

Unfortunately, although the impingement member is used to separate gas and liquid as described above, the air expelled from the oil separator still contains very small amount of oil. Thus, there has been a demand for further increase in the oil trapping rate of the oil separator.

Accordingly, it is an objective of the present invention to increase the oil trapping rate of an oil separator.

Means for Solving the Problems

Means and operation for solving the above issue will now be described.

To achieve the foregoing objective, an oil separator is provided that separates gas and liquid in air containing oil to recover liquid, which contains oil. The oil separator includes an introduction port, which introduces air, an oil trap, which traps oil contained in air, a reservoir, which stores liquid that has flowed out from the oil trap, and a discharge port, which discharges air from which the oil has been removed. The oil trap includes a glass fiber filter and an impingement member, which traps oil particles by causing the oil particles to strike the impingement member.

With this configuration, the impingement member traps oil particles having relatively large particle sizes among oil particles contained in air. The glass fiber filter traps oil particles having relatively small particle sizes. Thus, the oil trapping rate of the oil separator is improved.

The oil separator is preferably configured such that the impingement member has air permeability and includes a first surface, through which air flows in, and a second surface, through which air that has passed through the impingement member flows out, and that the glass fiber filter is provided on the second surface of the impingement member.

With this configuration, as air passes through the impingement member, oil particles having relatively large particle sizes are reduced. The air in which oil particles having relatively large particle sizes are reduced flows into the glass fiber filter. Thus, the glass fiber filter efficiently traps oil particles having relatively small particle sizes.

The oil separator is preferably configured such that the glass fiber filter is formed into a sheet and covers the entire second surface of the impingement member.

With this configuration, most of the air that has passed through the impingement member is allowed to pass through the glass fiber filter. This further increases the oil trapping rate.

The oil separator is preferably configured such that the impingement member has air permeability and includes a first surface, through which air flows in, and a second surface, through which air that has passed through the impingement member is discharged, and that the glass fiber filter is provided on the first surface of the impingement member.

With this configuration, air that has flowed into the oil trap passes through the glass fiber filter before passing through the impingement member. Thus, air in which oil particles having relatively small particle sizes are reduced flows into the impingement member.

The oil separator is preferably configured such that the impingement member is made of a urethane foam.

With this configuration, since the impingement member is made of a urethane foam, the impingement member is easily press fitted in a predetermined position in the oil separator together with the glass fiber filter.

To achieve the foregoing objective, another oil separator is provided that includes an introduction port, which introduces exhaust gas, an oil trap, which traps oil contained in exhaust gas, a reservoir, which stores liquid that has flowed out from the oil trap and contains oil, and a discharge port, which discharges exhaust gas from which the oil has been removed. The oil trap includes a plurality of filters each having a trapping rate corresponding to a particle size of oil particles, and the filters have different trapping rates.

With this configuration, since the oil trap includes multiple filters having different trapping rates depending on particle sizes, the oil trapping rate of the oil separator is improved.

The oil separator is preferably configured such that the filters included in the oil trap include a first filter having a high trapping rate for oil particles having a large particle size, and a second filter having a high trapping rate for oil particles having a small particle size. Also, the oil trap preferably includes the first filter at a position close to the introduction port.

With this configuration, since the first filter having a high trapping rate for oil particles having large particle sizes is provided at a position close to the introduction port, air in which large oil particles are reduced by passing through the first filter is allowed to flow into the second filter having a high trapping rate for oil particles having small particle sizes. Thus, the removal performance of the second filter for removing small oil particles is maximized.

Effects of the Invention

The present invention increases the oil trapping rate of the oil separator.

MODES FOR CARRYING OUT THE INVENTION

First Embodiment

An oil separator according to a first embodiment will now be described with reference to FIGS. 1 to 5.

Figure 1:
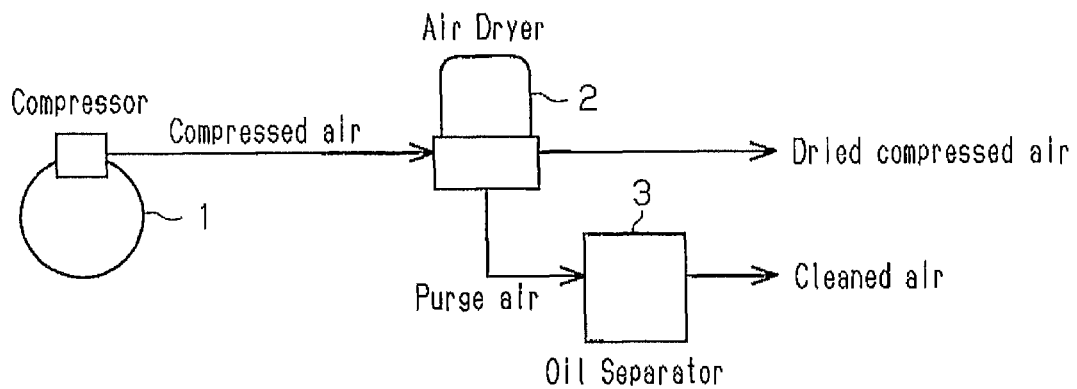
FIG. 1 is a schematic diagram illustrating a compressed air drying system according to a first embodiment.

As shown in FIG. 1, a compressed air drying system includes a compressor 1, an air dryer 2, and an oil separator 3. Compressed air delivered from the compressor 1 flows into the air dryer 2.

The air dryer 2 contains a desiccant and a filter for trapping oil mist. The desiccant traps water contained in the compressed air primarily as water vapor. The filter traps oil particles contained in the compressed air. The air dryer 2 executes a loading mode operation for trapping water and oil contained in compressed air and an unloading mode operation for expelling water and oil trapped by, for example, the desiccant to the outside. During the loading mode operation, the dried compressed air that has flowed out of the air dryer 2 is supplied to, for example, the air system of the brake and the air suspension. Air (purge air) discharged by executing the unloading mode operation and liquid containing water and oil are delivered to the oil separator 3. The ratio and the state of water and oil discharged from the air dryer 2 during the unloading mode operation differ depending on factors such as the type and the condition of the compressor 1 and the humidity and the temperature of the outside air. For example, water and oil are discharged from the air dryer 2 in a state where the water and oil are contained in purge air, and collected liquid might not be discharged.

The oil separator 3 removes water and oil contained in the purge air and recovers collected liquid. The air obtained by removing water and oil from the purge air is expelled to the atmosphere as cleaned air.

The structure of the oil separator 3 will now be described with reference to FIGS. 2 to 5.

Figure 2:
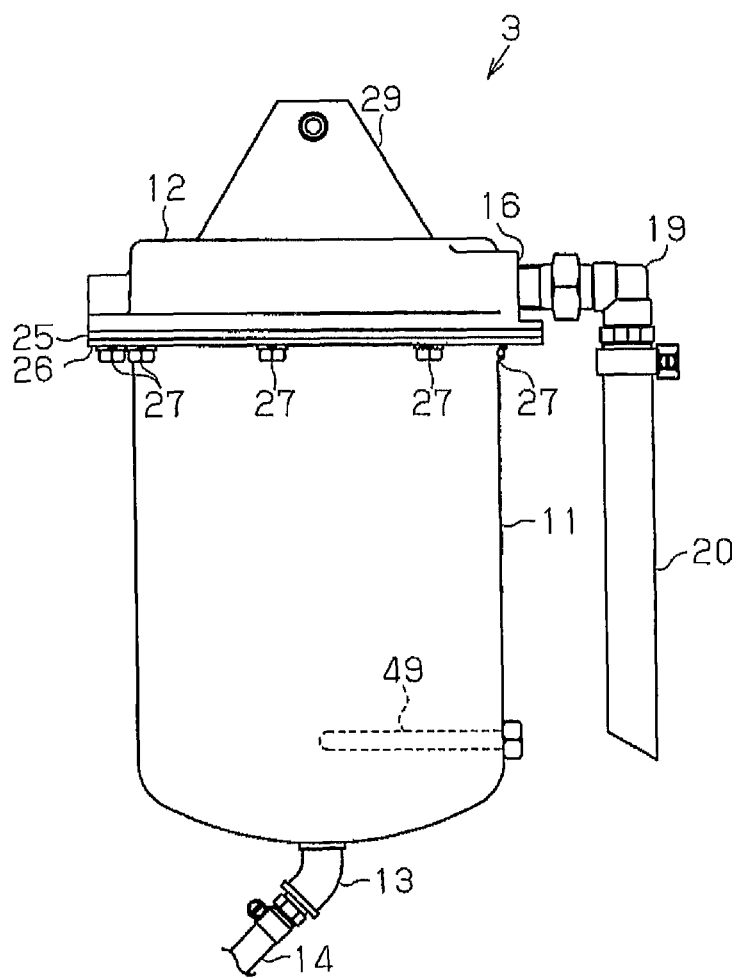
FIG. 2 is a side view of the oil separator according to the first embodiment.

As shown in FIG. 2, the oil separator 3 includes a cylindrical case 11 having a closed end and a lid 12, which seals the opening portion of the case 11. A drain outlet 13 for discharging collected liquid stored in the oil separator 3 is provided at the bottom portion of the case 11. A drain hose 14, which is used to remove collected liquid, is connected to the drain outlet 13.

A discharge port 16 for discharging clean air is provided on the lid 12. An air discharge hose 20, which expels clean air to the atmosphere, is connected to the discharge port 16 via a discharge coupling member 19. The lid 12 also has a mounting plate 29, which secures the oil separator 3 to a receiving body such as a vehicle body.

Figure 3:
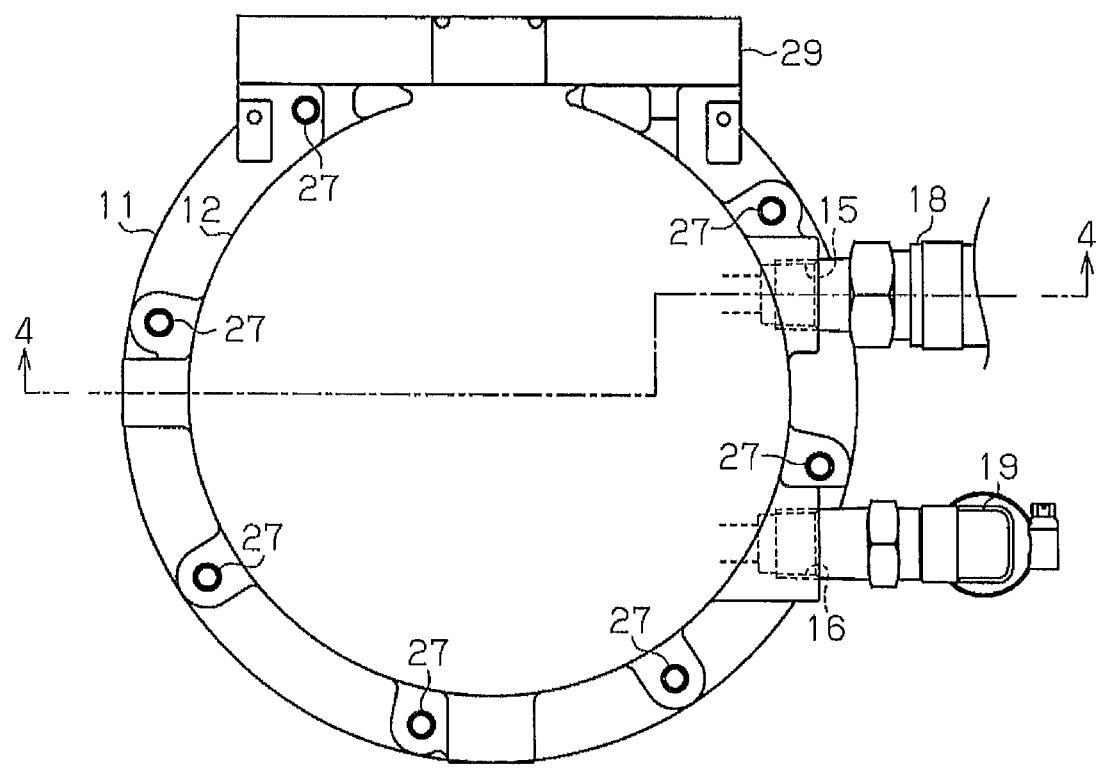
FIG. 3 is a plan view of the oil separator according to the first embodiment.

As shown in FIG. 3, in addition to the above-mentioned discharge port 16, the lid 12 has an introduction port 15, which introduces air discharged from the air dryer 2. A hose for supplying air that has flowed out from the air dryer 2 is connected to the introduction port 15 via an introduction coupling member 18.

Figure 4:
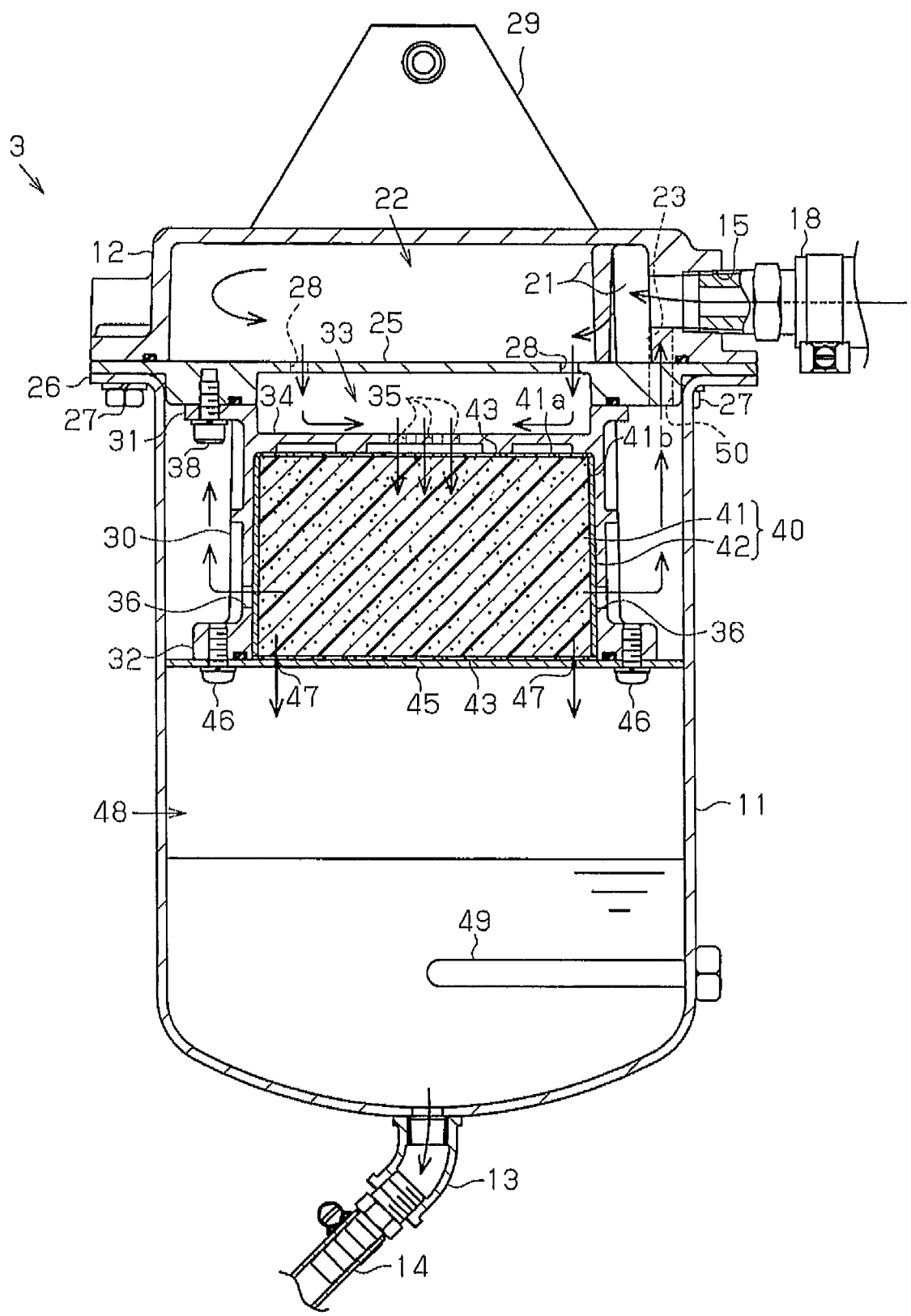
FIG. 4 is a cross-sectional view of the oil separator taken along line 4-4 in FIG. 3.

As shown in FIG. 4, the lid 12 is cylindrical and the vertically upper end is closed. Two baffle plates 21 are provided inside the lid 12 in the vicinity of the introduction port 15. The baffle plates 21 stand upright to be perpendicular to the flow direction of the purge air that has been introduced through the introduction port 15. The lid 12 also includes a communication portion 23, which connects the interior of the case 11 and the discharge port 16.

A disk-shaped cover 25 is provided between the case 11 and the lid 12. The case 11, the cover 25, and the lid 12 are secured to one another by fastening bolts 27 in through-holes formed in a flange portion 26 of the case 11, through-holes formed in the cover 25, and threaded bores formed in the lid 12.

The space defined by the cover 25 and the lid 12 functions as a first expansion chamber 22. A communication hole 28 is formed at the center portion of the cover 25. Furthermore, a cylindrical accommodation member 30 having a lid is secured to the bottom surface of the cover 25 with bolts 38. Flange portions 31, 32 are respectively formed on the upper end and the lower end of the accommodation member 30. The accommodation member 30 is fastened to the cover 25 by inserting the bolts 38 through the flange portion 31. The space defined by the upper surface of the fastened accommodation member 30 and the cover 25 functions as a second expansion chamber 33. The above-mentioned communication hole 28, which is formed in the cover 25, connects the first expansion chamber 22 to the second expansion chamber 33.

Through-holes 35 are formed at the center portion of an upper wall 34 of the accommodation member 30. The through-holes 35 and the communication hole 28 of the cover 25 are formed at positions that are not opposed to each other. Through-holes 36 are formed at the lower end of the side wall of the accommodation member 30 at intervals in the circumferential direction.

The accommodation member 30 accommodates an oil trap 40, which removes oil contained in purge air. The oil trap 40 includes a first filter, which is an impingement member 41, and a second filter, which is a glass fiber filter 42. The impingement member 41 is made of a porous plastic sponge (urethane foam) and is columnar in a state in which the impingement member 41 is accommodated in the accommodation member 30.

The glass fiber filter 42 is formed into a sheet and is wound around a second surface, or an outer circumferential surface 41b, of the columnar impingement member 41. Porous plates 43 are each provided on a first surface, or an upper surface 41a, and a bottom surface of the impingement member 41 to support the impingement member 41.

A support disk 45 for supporting the oil trap 40 is secured to the flange portion 32, which is formed at the lower end of the accommodation member 30, with screws 46. The support disk 45 has a diameter that is substantially equal to the inner diameter of the case 11. The support disk 45 includes through-holes 47 for allowing, for example, liquid oil trapped by the oil trap 40 to drop.

A reservoir, which is a collected liquid storage portion 48 in this embodiment, is provided at the lower section of the case 11 and stores the collected liquid that has dropped through the through-holes 47. A heater 49 for heating the stored liquid to vaporize water is provided in the collected liquid storage portion 48. Heating of the heater 49 is controlled by using a non-illustrated thermostat.

Figure 5:
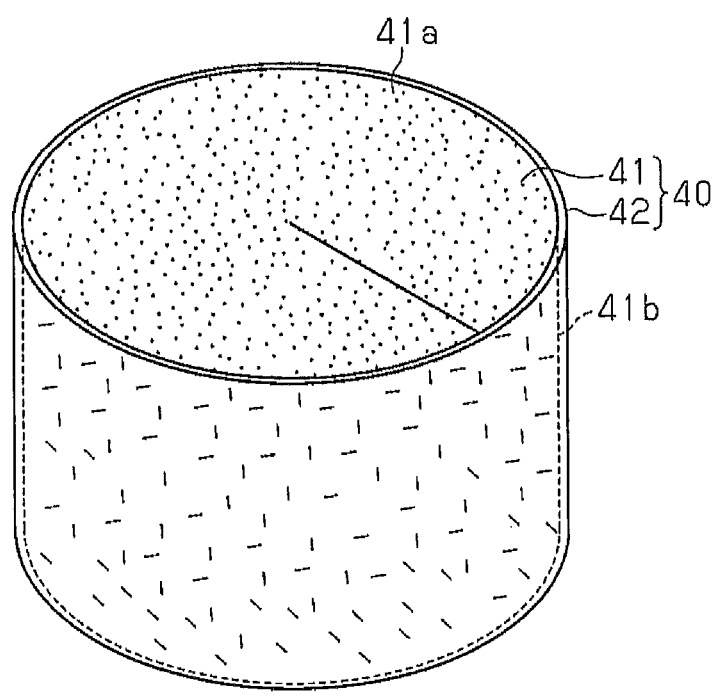
FIG. 5 is a perspective view of the oil trap according to the first embodiment.

The oil trap 40 will now be described with reference to FIG. 5. The impingement member 41 is formed into a columnar shape by rolling up both ends of a rectangular parallelepiped sponge to approach each other. The glass fiber filter 42 has the height and the width that are sufficient to cover the entire surface other than the flat surface and the bottom surface of the columnar impingement member 41, that is, the outer circumferential surface 41b. The impingement member 41 is accommodated inside the accommodation member 30 with the outer circumferential surface 41b covered with the glass fiber filter 42. The impingement member 41 and the glass fiber filter 42, which is wound around the impingement member 41, may be accommodated in the accommodation member 30 while being secured to each other with an adhesive or without being secured to each other.

In the present embodiment, the thickness of the glass fiber filter 42 is less than the diameter of the impingement member 41, and the volume of the impingement member 41 is greater than the volume of the glass fiber filter 42. In the drawing, the ratio of the diameter of the impingement member 41 and the thickness of the glass fiber filter 42 is adjusted for purposes of illustration of the glass fiber filter 42. However, the ratio may be changed in accordance with, for example, the oil trap performance of a sponge and glass fiber and factors in the compressed air drying system as required.

The impingement member 41 finely changes the air flow with the holes in the sponge and causes oil particles that move along with the air flow to strike the impingement member 41 by inertial force, thereby trapping the oil particles. Among oil particles contained in the purge air as oil, many of the oil particles trapped by the impingement member 41 have relatively large particle sizes.

The glass fiber filter 42 includes glass fiber and may be formed by, for example, fixing glass fiber to a base material such as a non-woven fabric, compressing glass fiber alone, or compressing glass fiber with other materials. The glass fiber filter 42 has a fiber diameter, a pore diameter, and a density in the depth direction that allows for trapping of fine oil particles that perform Brownian motion in the compressed air.

Although it depends on the flow velocity of air, large oil particles having particle sizes greater than or equal to, for example, 1 μm are most efficiently trapped by using the inertial impaction described above. The number of small oil particles contained in the compressed air is greater than the number of the large oil particles. The small oil particles collide with gas molecules in the compressed air and perform random movements (Brownian motion) irrelevant to the flow of the compressed air. The particle size of the oil particles that perform random movements is, for example, less than or equal to 50 nm. Such oil particles are hard to trap by the method that uses the inertial impaction and is more efficiently trapped by contact with glass fibers. Oil particles having medium particle sizes of, for example, over 50 nm and less than 1 μm can be trapped by both the impingement member 41 and the glass fiber filter 42 although the efficiency is slightly decreased. In other words, since the size of oil particles that are efficiently trapped by the impingement member 41 differs from the size of oil particles that are efficiently trapped by the glass fiber filter 42, oil particles of a wide range of sizes can be trapped as a whole.

Although the number of oil particles having small particle sizes are relatively great in the purge air as described above in general, the ratio of the total volume of oil particles having large particle sizes and the total volume of oil particles having small particle sizes differs depending on the individual differences of the compressor 1 and the operating atmosphere (such as the temperature and the humidity). However, the trapping performance for trapping oil particles can be adjusted by changing the ratio of the volume of the impingement member 41 and the volume of the glass fiber filter 42. Thus, the configurations such as the size of the impingement member 41 and the thickness of the glass fiber filter 42 are not limited to those illustrated in, for example, FIGS. 4 and 5 and may be changed as required. For example, the volume of the glass fiber filter 42 can be greater than the volume of the impingement member 41.

Operation of the oil separator 3 configured as described above will now be described with reference to FIG. 4.

The purge air discharged from the air dryer 2 flows into the oil separator 3 through the introduction port 15 as shown by the direction of the arrow in the drawing. The purge air that has flowed in through the introduction port 15 strikes the baffle plates 21 and is then introduced into the first expansion chamber 22 to be expanded.

The purge air that has been expanded in the first expansion chamber 22 flows into the second expansion chamber 33 through the communication hole 28, which is formed in the cover 25, and is then expanded. The purge air further flows through the through-holes 35 in the upper wall 34 of the accommodation member 30 into the oil trap 40 in the accommodation member 30. The purge air that has flowed into the oil trap 40 first passes through the impingement member 41. Thus, oil particles having large particle sizes contained in the purge air are trapped. At this time, water contained in the purge air is also trapped.

The purge air in which the number of oil particles having large particle sizes has been reduced flows into the glass fiber filter 42. The glass fiber filter 42 mainly traps oil particles having relatively small particle sizes that remain in the purge air as described above. At this time, water contained in the purge air is also trapped.

The liquid water and oil trapped by the oil trap 40 move through the oil trap 40, reach the upper surface of the support disk 45, and drop through the through-holes 47 in the support disk 45 to be stored in the collected liquid storage portion 48. In a case in which collected liquid flows into the oil separator 3, the liquid moves along the same path as described above, passes through the oil trap 40, and drops into the collected liquid storage portion 48.

The collected liquid stored in the collected liquid storage portion 48 is heated by the heater 49 so that the water is vaporized. The collected liquid stored in the collected liquid storage portion 48 is discharged through the drain hose 14 as required.

The cleaned air, from which water and oil have been removed by the oil trap 40, flows through the through-holes 36 in the side surface of the accommodation member 30 into the space formed between the accommodation member 30 and the case 11. The air that has passed through the space passes through a communication hole 50 formed in the cover 25 and a communication portion 23 in the lid 12 and is then discharged through the discharge port 16 (see FIG. 2 or 3).

The first embodiment has the following advantages.

(1) The impingement member 41 mainly traps oil particles having large particle sizes among oil particles contained in the air, and the glass fiber filter 42 mainly traps oil particles having small particle sizes. Thus, oil particles of a wide range of sizes can be trapped as a whole, which results in the improved oil trapping rate of the oil separator 3.

(2) The glass fiber filter 42 is located on the outer circumferential surface 41*b* of the impingement member 41. Thus, the air in which oil particles having large particle sizes are reduced by penetrating through the impingement member 41 flows into the glass fiber filter 42. As a result, the removal performance of the glass fiber filter 42 for removing the oil particles having small particle sizes is maximized.

(3) Since the sheet-like glass fiber filter 42 is wound around the entire outer circumferential surface 41*b* of the impingement member 41, most of the air that has passed through the impingement member 41 also passes through the glass fiber filter 42. This further increases the oil trapping rate.

(4) The oil trap 40 includes the impingement member 41 made of a sponge. Thus, inertial impaction of oil particles on the impingement member 41 occurs, causing the oil particles to be trapped. Furthermore, since the impingement member 41 and the glass fiber filter 42 are both made of material that can be easily compressed, the impingement member 41, around which the glass fiber filter 42 is wound, is easily pressed into the accommodation member 30.

Second Embodiment

An oil separator according to a second embodiment will now be described. The description focuses on the difference between the first embodiment and the second embodiment. In the oil separator according to the present embodiment, only the structure of the oil trap differs from that of the oil separator in the first embodiment. Thus, explanations for other structures are omitted.

Figure 6:
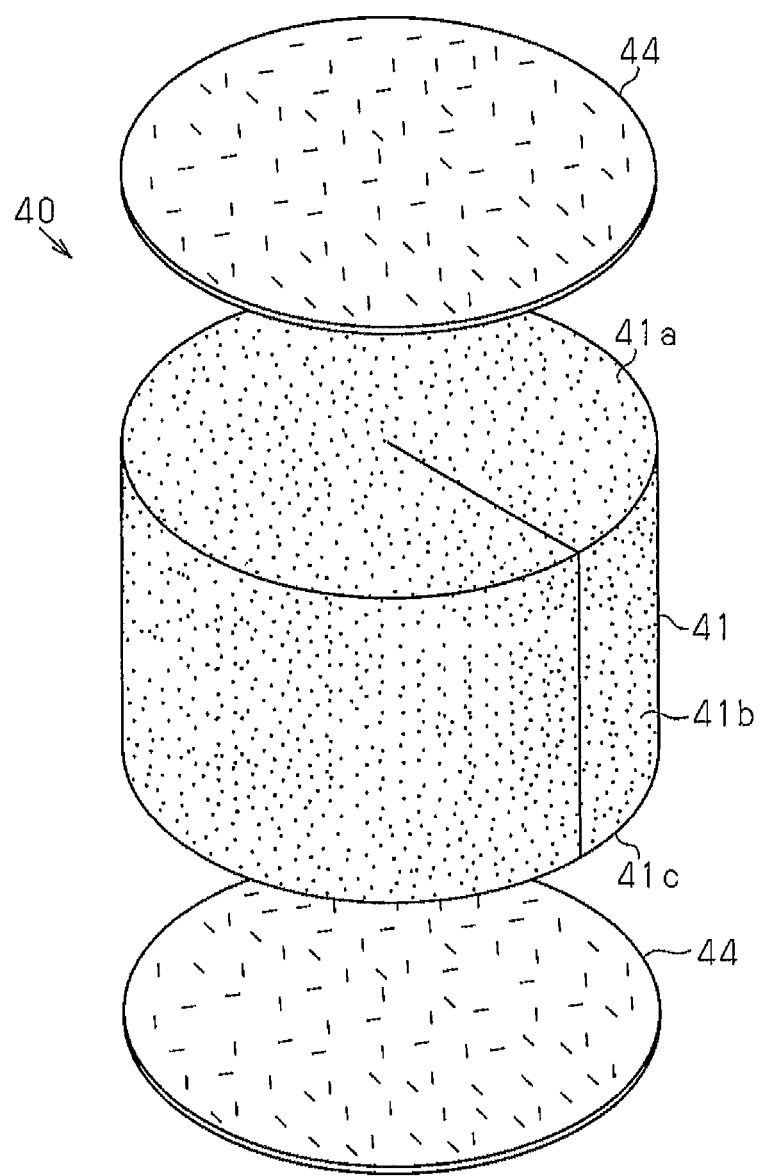
FIG. 6 is a perspective view of an oil trap according to a second embodiment.

As shown in FIG. 6, the oil trap 40 includes the columnar impingement member 41 and a pair of glass fiber filters 44, which is placed on the upper surface 41*a* and the bottom surface 41*c* of the impingement member 41. The glass fiber filters 44 have basically the same structure as the first embodiment and are formed into a circular shape.

Figure 7:
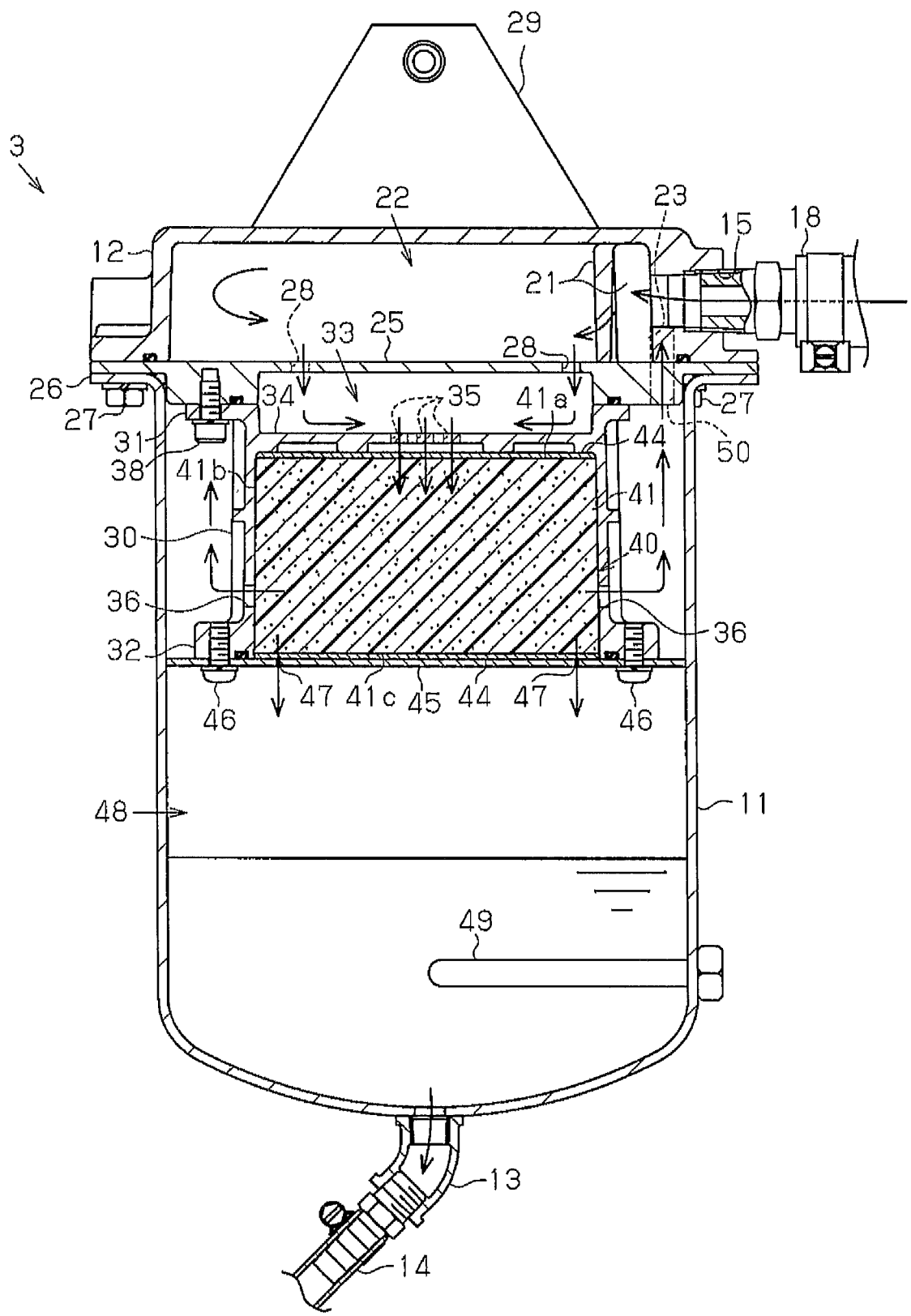
FIG. 7 is a cross-sectional view of an oil separator according to the second embodiment.

As shown in FIG. 7, in a state in which the oil trap 40 is accommodated in the accommodation member 30, the upper glass fiber filter 44 is located below the upper wall 34 of the accommodation member 30, and the lower glass fiber filter 44 is located on the support disk 45.

Operation of the present embodiment will now be described.

The purge air in the second expansion chamber 33 flows into the accommodation member 30 through the through-holes 35 in the upper wall 34 and first passes through the glass fiber filter 44. At this time, among the oil particles contained in the purge air, the oil particles having small particle sizes are mainly trapped. The purge air that has passed through the upper glass fiber filter 44 flows into the impingement member 41. At this time, like the first embodiment, the oil particles having large particle sizes are mainly trapped.

Some of the purge air that has passed through the impingement member 41 passes through the lower glass fiber filter 44 and then back through the inside of the impingement member 41 or the space between the impingement member 41 and the side wall of the accommodation member 30 to flow out to the outside of the accommodation member 30 through the through-holes 36 in the side wall of the accommodation member 30. Some of the purge air does not pass through the lower glass fiber filter 44 and flows out to the outside of the accommodation member 30. The cleaned air that has flowed out to the outside of the accommodation member 30 passes through a communication hole 50 formed in the cover 25 and the communication portion 23 of the lid 12 and is discharged through the discharge port 16. The liquid water and oil trapped by the oil trap 40 move through the oil trap 40 and are stored in the collected liquid storage portion 48.

As described above, the present embodiment has the following advantages in addition to the advantages (1), (3), and (4).

(5) The glass fiber filter 44 is located on the upper surface 41*a* of the impingement member 41 through which the purge air flows in. Thus, at the initial stage when the purge air flows into the oil trap 40, most of the purge air passes through the glass fiber filter 44. This structure increases the oil trapping rate of the impingement member 41 by allowing the purge air in which the number of small oil particles has been reduced to flow into the impingement member 41. Since the pair of glass fiber filters 44 sandwiches the impingement member 41, the contact area between the purge air and the glass fiber is increased. This further increases the oil trapping rate of the oil separator 3.

Other Embodiments

The above described embodiments may be modified as follows.

Figure 8:
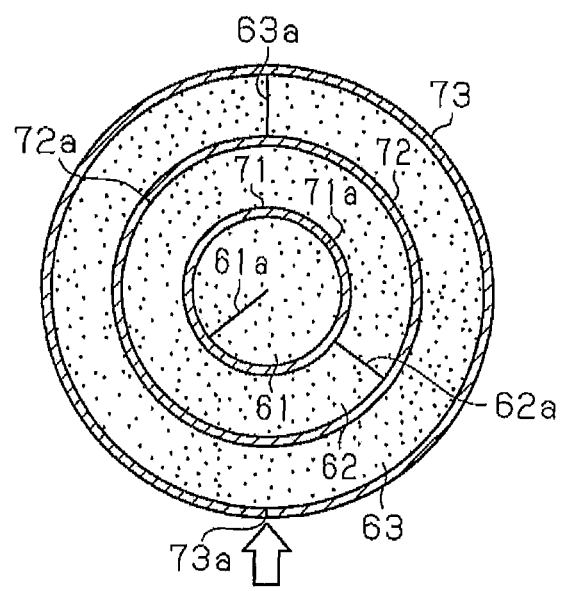
FIG. 8 is a plan view of an oil trap according to a modification.

As shown in FIG. 8, the oil trap 40 may include multiple impingement members including a first impingement member 61, which is formed by rolling up a rectangular parallelepiped sponge such that ends of the sponge approach each other, a cylindrical second impingement member 62, which is arranged on the outer side of the first impingement member 61, and a cylindrical third impingement member 63, which is arranged on the outer side of the second impingement member 62. The second impingement member 62 and the third impingement member 63 are formed by rolling up a rectangular parallelepiped or plate-like sponge such that the ends of the sponge approach each other. A first glass fiber filter 71 wound around the outer circumference of the first impingement member 61 is arranged between the first impingement member 61 and the second impingement member 62. A second glass fiber filter 72 wound around the outer circumference of the second impingement member 62 is arranged between the second impingement member 62 and the third impingement member 63. Furthermore, a third glass fiber filter 73 is wound around the outer side of the third impingement member 63. A joint portion 61*a* of the first impingement member 61, a joint portion 71*a* of the first glass fiber filter 71, a joint portion 62*a* of the second impingement member 62, a joint portion 72*a* of the second glass fiber filter 72, a joint portion 63*a* of the third impingement member 63, and a joint portion 73*a* of the third glass fiber filter 73 are located at different positions in the circumferential direction of the oil trap 40. Since the joint portions 61*a* to 63*a* and 71*a* to 73*a* are arranged at different positions as described above, even if air enters the oil trap 40 from any positions, the joint portions 61*a* to 63*a* and 71*a* to 73*a* do not hinder the air from flowing into the oil trap 40 and allows the air to surely pass through the oil trap 40.

Figure 9:
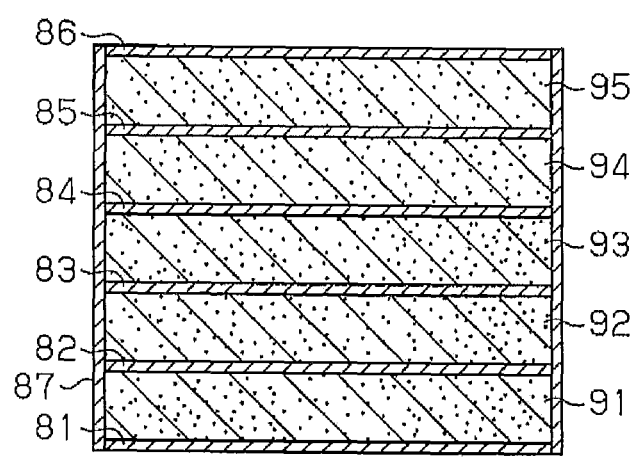
FIG. 9 is a cross-sectional view of an oil trap according to a modification.

As shown in FIG. 9, impingement members made of a sponge and glass fiber filters may be laminated in the axial direction of the columnar oil trap 40. For example, five impingement members 91 to 95 may be arranged between six glass fiber filters 81 to 86. Furthermore, a glass fiber filter 87 may be wound around the outer circumference of a laminated body including the glass fiber filters 81 to 86 and the impingement members 91 to 95.

Figure 10:
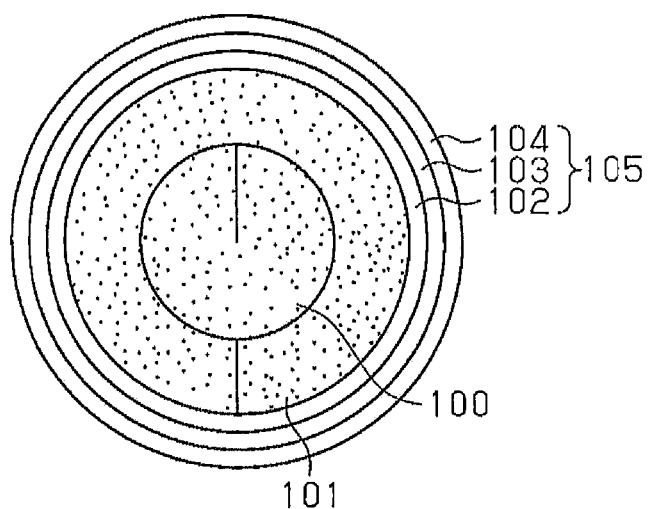
FIG. 10 is a plan view of an oil trap according to a modification.

As shown in FIG. 10, multiple glass fiber filters may be wound around the impingement member to adjust the thickness of the glass fiber filter. For example, the oil trap 40 includes a first impingement member 100, which is a rectangular parallelepiped sponge rolled up such that the ends of the sponge approach each other, and a second impingement member 101, which is wound around the outer circumference of the first impingement member 100. Three glass fiber filters 102 to 104 are wound around the outer circumference of the second impingement member 102. These glass fiber filters 102 to 104 may have the same property or different properties such as the weight per volume. With this configuration, the thickness of the glass fiber filter layer is adjusted to control the oil trap performance. A glass fiber filter may also be provided between the first impingement member 100 and the second impingement member 102.

Figure 11:
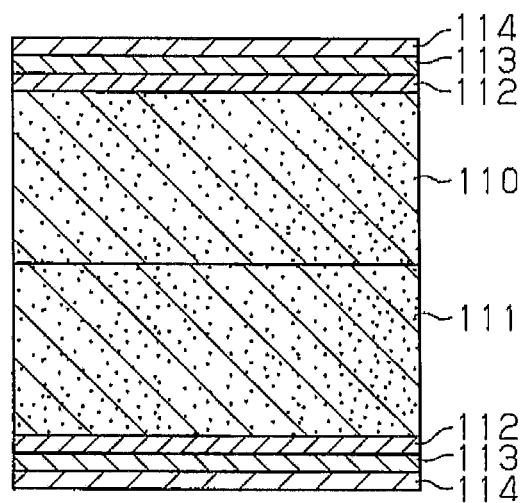
FIG. 11 is a cross-sectional view of an oil trap according to a modification.

As shown in FIG. 11, impingement members made of a sponge and glass fiber filters may be laminated in the axial direction of the columnar oil trap 40, and the thickness of the glass fiber filters may be adjusted by the number of the laminated glass fiber filters. For example, three glass fiber filters 112 to 114 may be laminated on one of the axial end faces of each of a pair of impingement members 110, 111. In this case, the thickness of the glass fiber filter layer is adjusted to control the oil trap performance. A glass fiber filter may also be provided between the impingement members 110, 111.

In each of the above-mentioned embodiments, the thickness of the glass fiber filter 42 is less than the diameter of the columnar impingement member 41, and the volume of the glass fiber filter 42 is less than the volume of the impingement member 41. However, these configurations may be changed. For example, the thickness of the glass fiber filter 42 may be set greater than the diameter of the columnar impingement member 41, or the volume of the glass fiber filter 42 may be set greater than the volume of the impingement member 41 depending on factors in the compressed air drying system, the oil trap performance of the glass fiber filter 42, and the like.

In each of the above-mentioned embodiments, the impingement member 41 and the glass fiber filter 42 also trap water, but do not necessarily have to trap water.

The impingement member 41 may trap oil particles that are electrically charged while being suspended in the air by using static electricity force.

In each of the above-mentioned embodiments, the impingement member is configured by the impingement member 41, but may be configured by finely porous metal material (such as a crushed aluminum member) or baffle plates.

In the above-mentioned embodiments, the drain hose 14 is connected to the drain outlet 13 of the case 11. However, the drain hose 14 may be omitted, and a plug may be provided in the drain outlet 13 to directly discharge liquid from the drain outlet 13.

In the above described embodiments, the first expansion chamber 22 and the second expansion chamber 33 are provided in the oil separator 3. However, one of the first expansion chamber 22 and the second expansion chamber 33 may be omitted to have a single expansion chamber.

In the above-mentioned configuration, the number of the heater 49 may be changed as required, and the heater 49 may also be omitted.

The glass fiber filter may be provided to cover both the upper surface 41*a* (the first surface) and the outer circumferential surface 41*b* (the second surface) of the impingement member 41. The glass fiber filter may also be provided to cover all surfaces of the impingement member 41.

In the second embodiment, the glass fiber filter 44 provided on the bottom surface 41*c* of the impingement member 41 can be omitted depending on, for example, the oil trap performance of the filter itself.

The configuration of the oil separator 3 other than the oil trap 40 may differ from the configuration in each of the above-described embodiments. For example, the oil separator 3 may be a cartridge in which the accommodation member 30 is secured to the main body including the case 11 with a threaded portion. The cover 25 may also be omitted. Furthermore, the structure for connecting the introduction port 15 to the hose of the air dryer and the structure for connecting the discharge port 16 to the air discharge hose 20 may be other known connecting structures.

In each of the above-mentioned embodiments, air that has passed through the oil trap 40 is allowed to flow through the through-holes 36 formed in the side wall of the accommodation member 30 to the outside of the accommodation member 30. However, a through-hole for discharging air may be formed in the bottom wall of the accommodation member 30. In this case, the second surface, from which air that has passed through the impingement member 41 flows out, is the bottom surface of the impingement member 41.

In each of the above-mentioned embodiments, the oil trap 40 is configured by the impingement member made of a urethane foam and the glass fiber filter, but may be configured by any filters having different trapping rates for capturing oil particles depending on particle sizes. That is, the oil trap 40 may be configured by filters that have the highest trapping rate for different particle sizes. For example, the oil trap 40 may be configured by impingement members each having a high trapping rate for a different particle size.

In each of the above-mentioned embodiments, the oil separator 3 allows purge air to flow in from the vertically upper section of the oil trap 40 into the oil trap 40. However, purge air may flow in from the vertically lower section of the oil trap 40 or from the outer circumferential surface of the oil trap 40. An impingement member that has a high trapping rate for oil particles having a large particle size may be arranged on the surface of the oil trap 40 through which purge air flows in depending on size distribution of oil particles contained in purge air. Alternatively, a glass fiber filter that has a high trapping rate for oil particles having a small particle size may be provided.

In the above-mentioned embodiments, the oil separator 3 is provided in the exhaust system of the air dryer 2, which is downstream of the compressor 1 of the air system. However, the oil separator 3 may be provided downstream of the compressor 1 of the air system and upstream of the air dryer 2. In this case, oil is separated from the air containing, for example, lubricant in the compressor 1, and cleaned air is supplied to the air dryer 2. Thus, the desiccant in the air dryer 2 is prevented from being deteriorated due to the oil.

DESCRIPTION OF THE REFERENCE NUMERALS

1 . . . Compressor, 2 . . . Air Dryer, 3 . . . Oil Separator, 11 . . . Case, 12 . . . Lid, 13 . . . Drain Outlet, 14 . . . Drain Hose, 15 . . . Introduction Port, 16 . . . Discharge Port, 18 . . . Introduction Coupling Member, 19 . . . Discharge Coupling Member, 20 . . . Air Discharge Hose, 21 . . . Baffle Plate, 22 . . . First Expansion Chamber, 23 . . . Communication Portion, 25 . . . Cover, 26 . . . Flange Portion, 27 . . . Bolt, 28 . . . Communication Hole, 29 . . . Mounting Plate, 30 . . . Accommodation Member, 31 . . . Flange Portion, 32 . . . Flange Portion, 33 . . . Second Expansion Chamber, 34 . . . Upper Wall, 35 . . . Through-Hole, 36 . . . Through-Hole, 40 . . . Oil Trap, 41 . . . Impingement Member, 41a . . . Upper Surface, 41b . . . Outer Circumferential Surface, 41c . . . Bottom Surface, 42 . . . Glass Fiber Filter, 43 . . . Plate, 44 . . . Glass Fiber Filter, 45 . . . Support Disk, 46 . . . Screw, 47 . . . Through-Hole, 48 . . . Collected Liquid Storage Portion, 49 . . . Heater, 50 . . . Communication Hole.

The invention claimed is:

1. An oil separator configured to separate gas and liquid in air containing oil to recover liquid, which contains oil, the oil separator comprising:
   an introduction port configured to introduce air;
   an oil trap configured to trap oil contained in air;
   a reservoir configured to store liquid that has flowed out from the oil trap; and
   a discharge port configured to discharge air from which the oil has been removed,
   wherein the oil trap includes a glass fiber filter and a columnar impingement member, which traps oil particles by causing the oil particles to strike the columnar impingement member; wherein the columnar impingement member has air permeability and includes an upper surface, through which air flows in, a bottom surface, and an outer circumferential surface, through which air that has passed through the columnar impingement member flows out, and wherein the glass fiber filter is provided on the outer circumferential surface of the impingement member; and wherein the glass fiber filter is formed into a sheet and covers the entire outer circumferential surface of the columnar impingement member.

2. The oil separator according to claim 1, wherein the columnar impingement member has air permeability and includes an upper surface, through which air flows in, a bottom surface, and an outer circumferential surface, through which air that has passed through the columnar impingement member is discharged, and
   wherein the glass fiber filter is provided on the upper surface and the bottom surface of the columnar impingement member.

3. The oil separator according to claim 1, wherein the columnar impingement member is made of a urethane foam.

4. An oil separator, comprising:
   an introduction port configured to introduce exhaust gas;
   columnar oil trap configured to trap oil contained in exhaust gas;
   a reservoir configured to store liquid that has flowed out from the columnar oil trap and contains oil; and
   a discharge port configured to discharge exhaust gas from which the oil has been removed,
   wherein the columnar oil trap includes a plurality of filters, each of the plurality of filters having a trapping rate corresponding to a particle size of oil particles, and each of the plurality of filters have different trapping rates; wherein the columnar impingement member has air permeability and includes an upper surface, through which air flows in, a bottom surface, and an outer circumferential surface, through which air that has passed through the columnar impingement member flows out, and wherein the glass fiber filter is provided on the outer circumferential surface of the impingement member; and wherein the glass fiber filter is formed into a sheet and covers the entire outer circumferential surface of the columnar impingement member.

5. The oil separator according to claim 4, wherein the plurality of filters included in the columnar oil trap includes:
   a first filter having a high trapping rate for oil particles having a large particle size, and
   a second filter having a high trapping rate for oil particles having a small particle size,
   wherein the columnar oil trap includes the first filter at a position close to the introduction port.

6. The oil separator according to claim 4, wherein the plurality of filters comprises:
   a cylindrical first filter,
   a second filter arranged on an outer side of the first filter,
   a cylindrical third filter surrounding the first filter and the second filter, and
   a fourth filter arranged on an outer side of the third filter.

7. The oil separator according to claim 6, wherein each of the first filter and the third filter is made of a urethane foam, and
   wherein each of the second filter and the fourth filter is a glass fiber filter.

8. The oil separator according to claim 4, wherein the plurality of filters comprises:
   a columnar impingement member comprising a plurality of columnar portions stacked in an axial direction, and
   a plurality of glass fiber filters, each of which is arranged between adjacent columnar portions.

9. The oil separator according to claim 8, wherein the plurality of filters further comprises a glass fiber filter arranged on an outer side of the columnar impingement member.

10. The oil separator according to claim 4, wherein the plurality of filters further comprises:
   a columnar impingement member, and
   a plurality of glass fiber filters laminated and arranged on an outer side of the columnar impingement member.

11. The oil separator according to claim 4, wherein the plurality of filters comprises:
   a columnar impingement member comprising a plurality of columnar portions stacked in an axial direction, and
   glass fiber filters provided on an upper surface and a bottom surface of the impingement member.

\* \* \* \* \*